Patented Feb. 27, 1923.

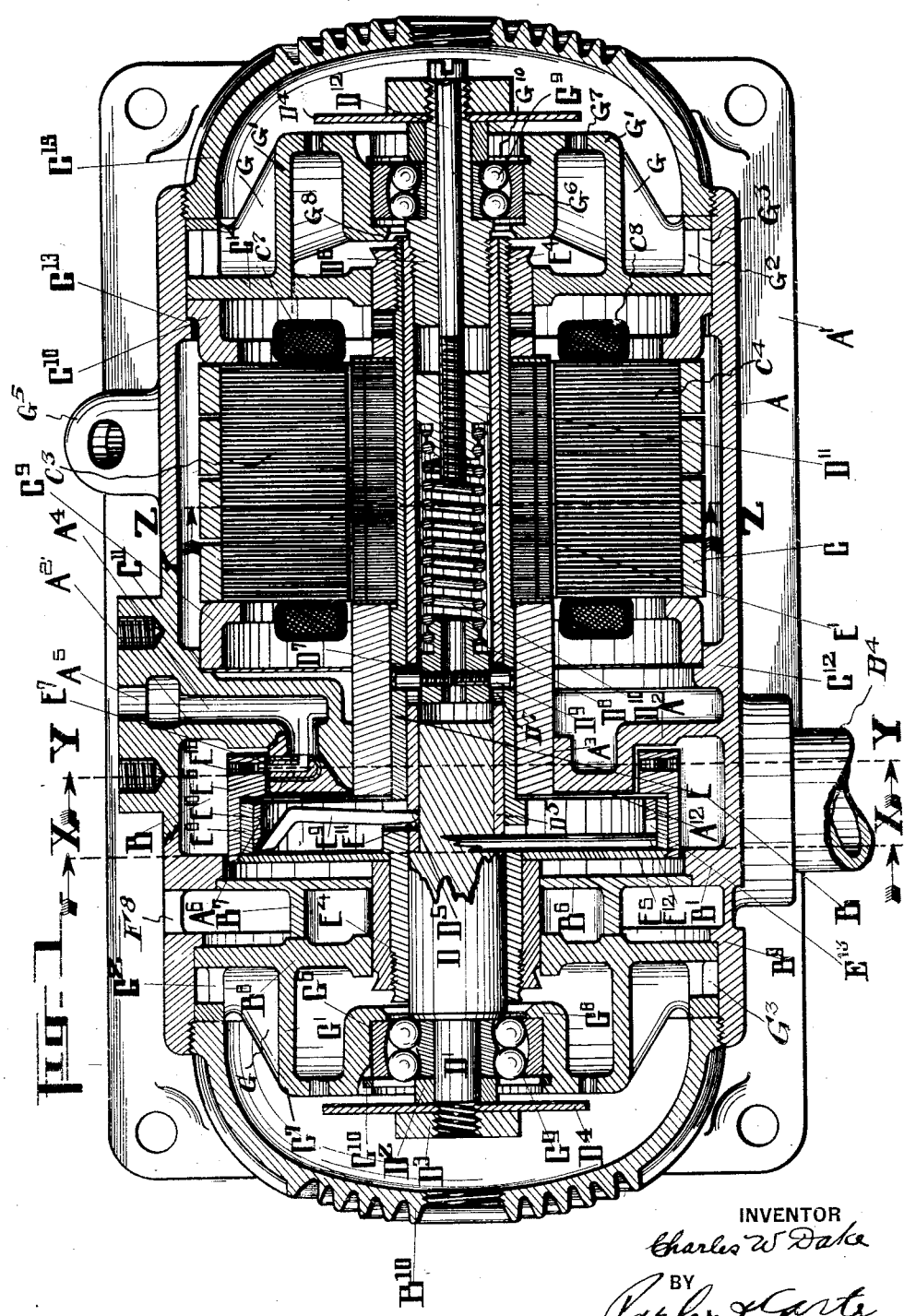

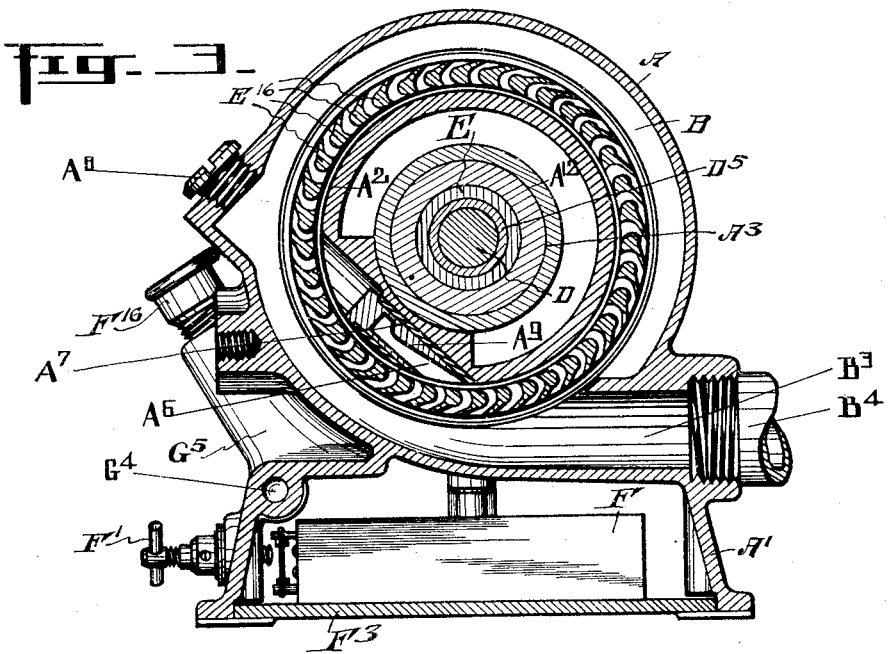
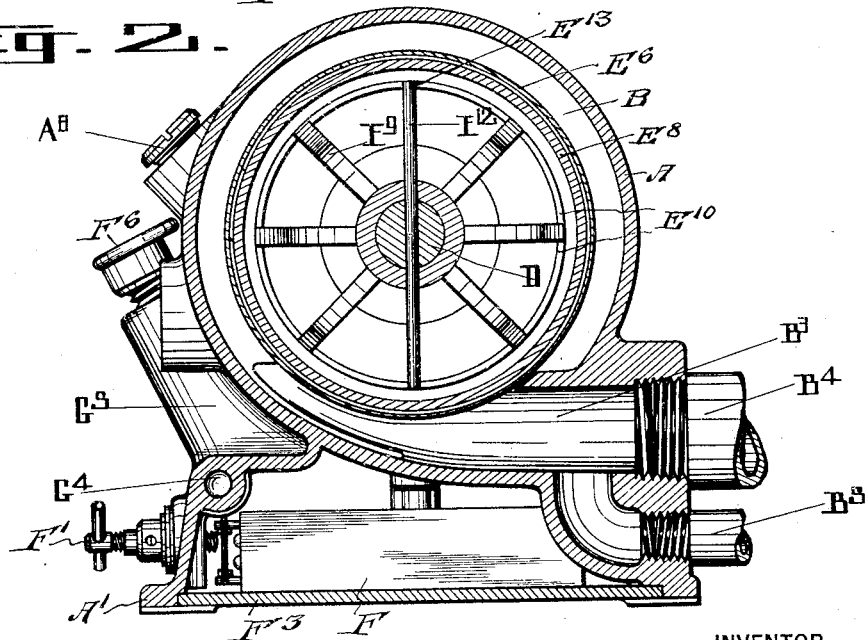

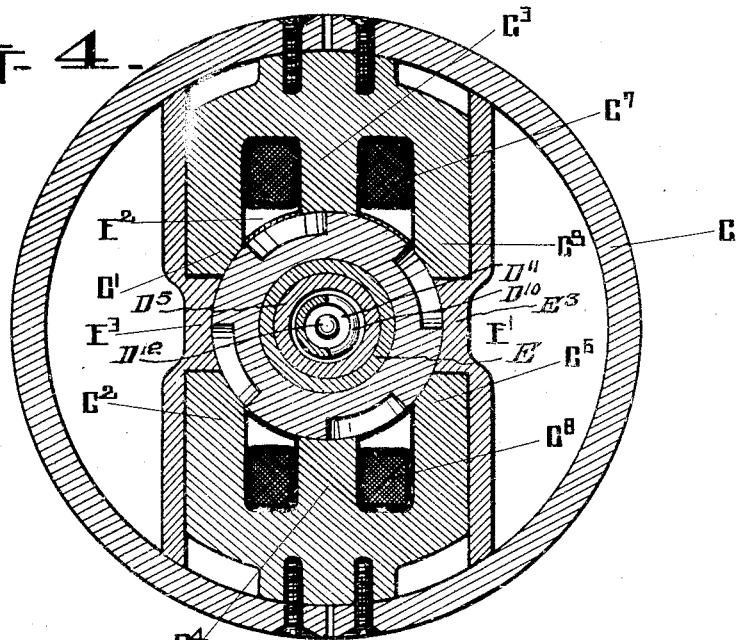
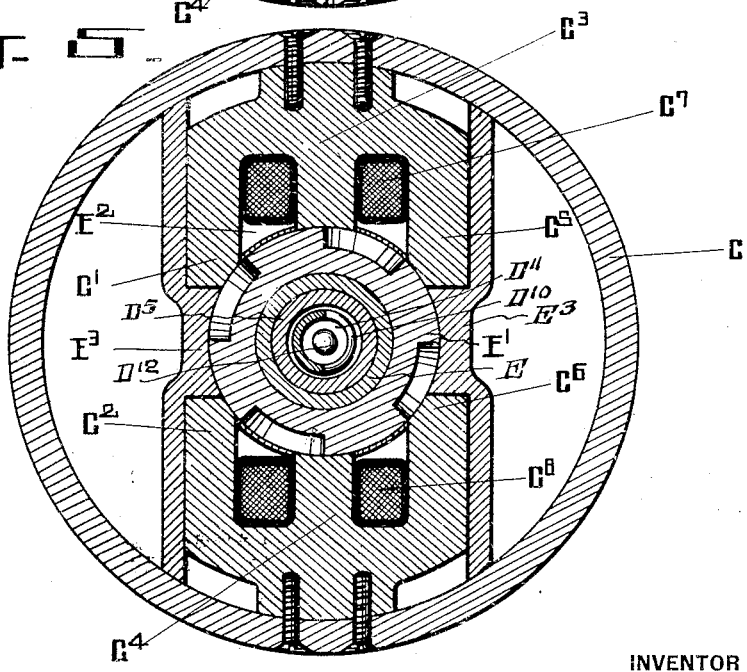

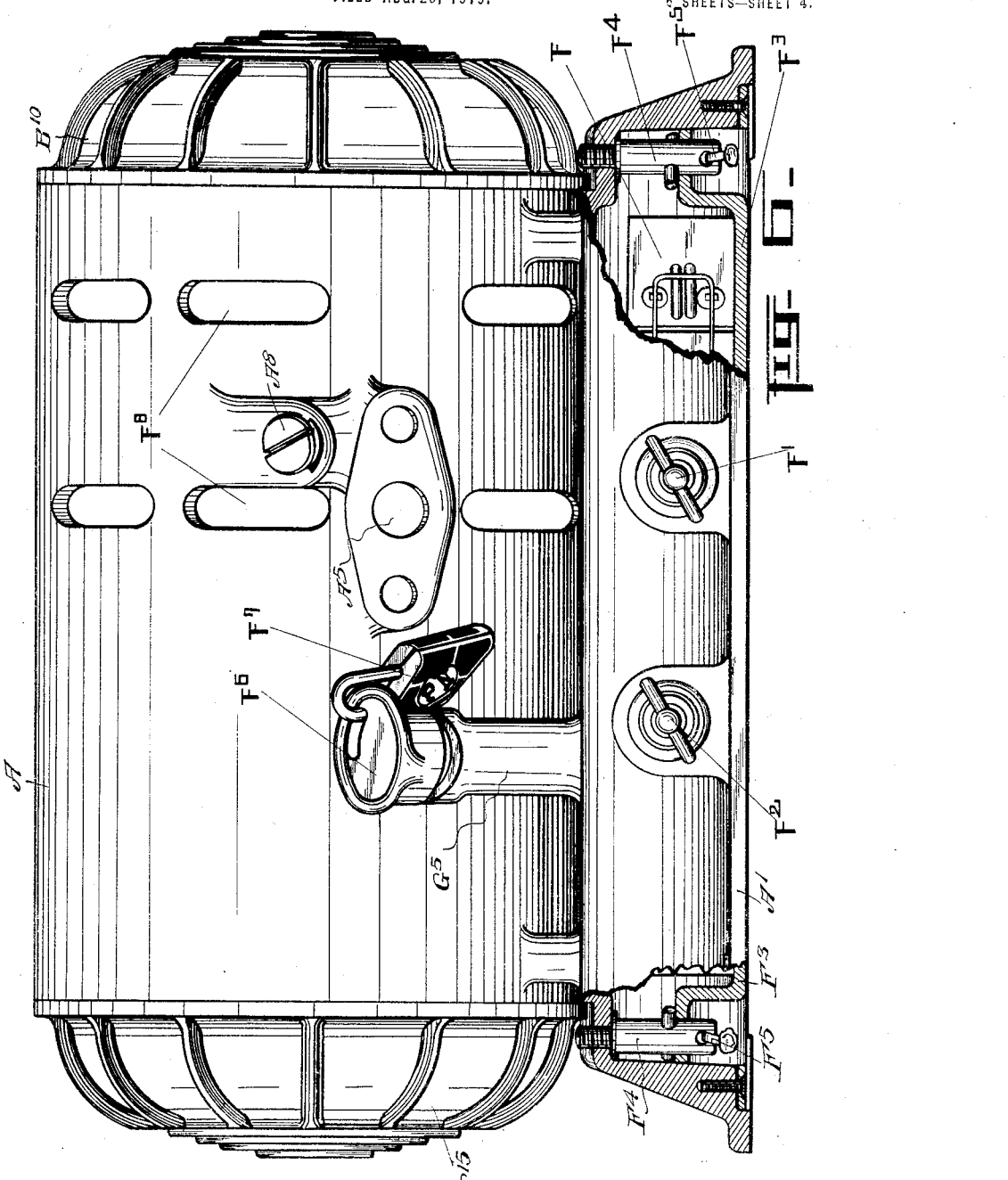

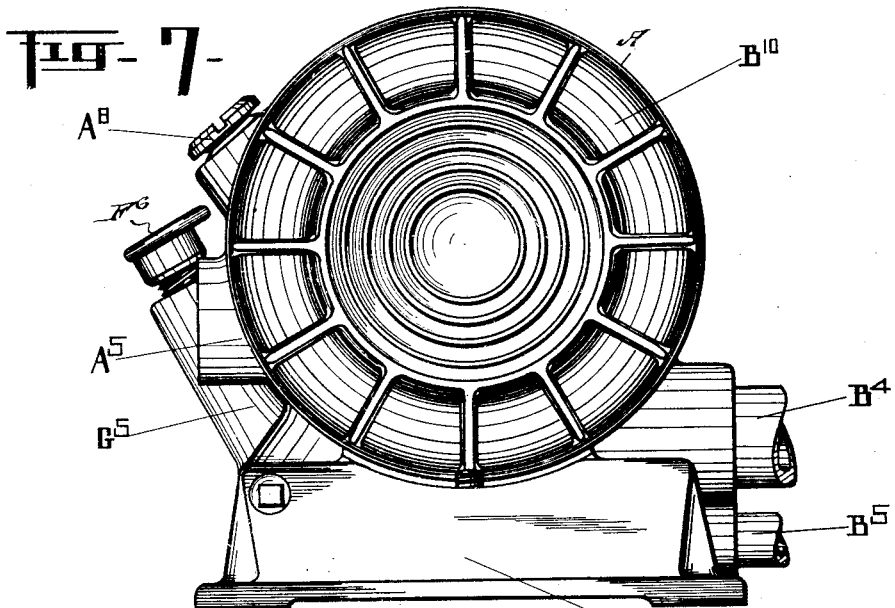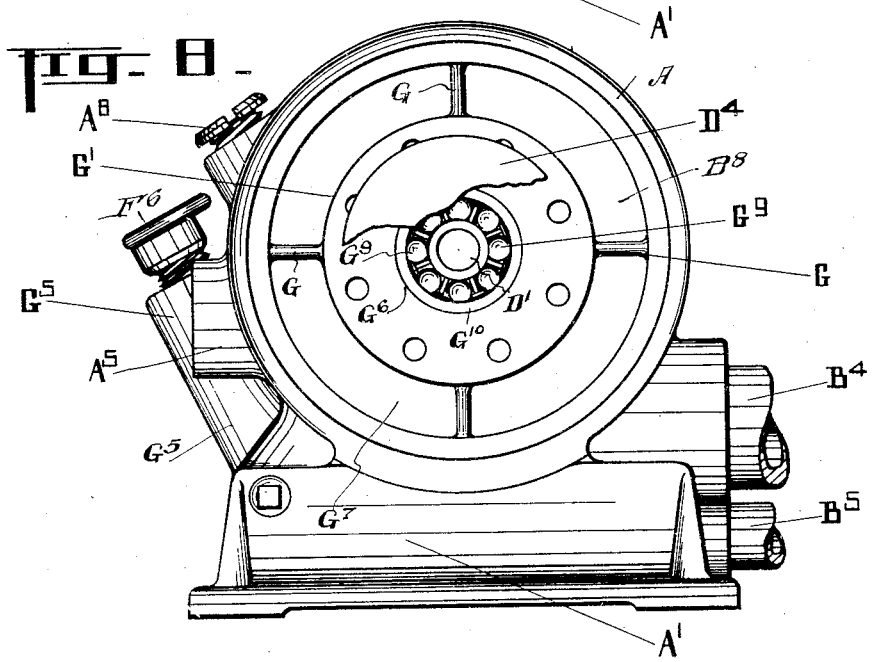

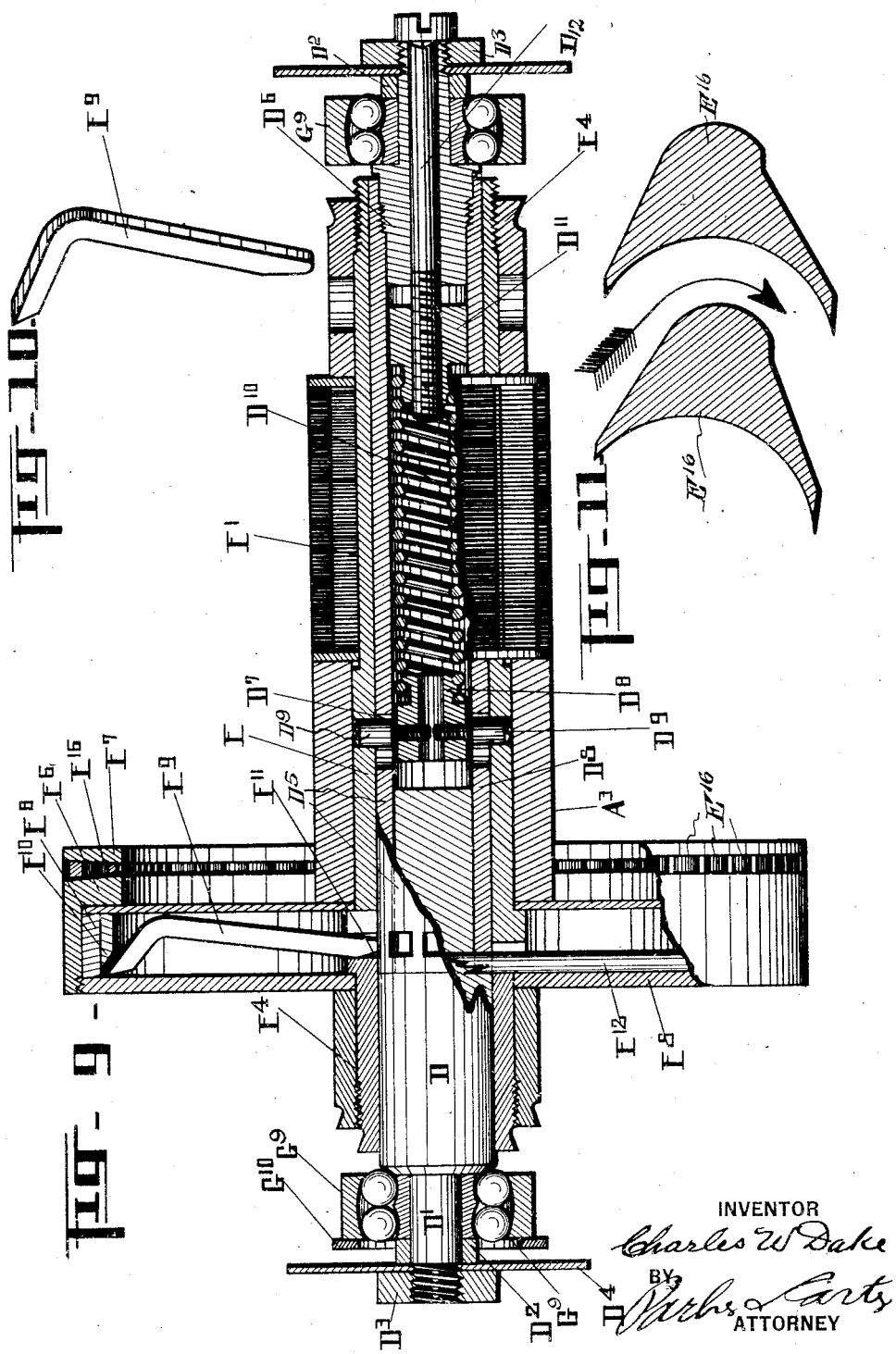

1,446,787

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

TURBOGENERATOR SET.

Application filed August 20, 1919. Serial No. 318,651.

*To all whom it may concern:*

Be it known that I, CHARLES W. DAKE, a citizen of the United States, residing at Chicago, in the county of Cook and State of Illinois, have invented a certain new and useful Improvement in Turbogenerator Sets, of which the following is a specification.

My invention relates to improvements in turbo generator set and has for one object to provide a new and improved form which will be light, self contained, fool proof and easy to manufacture, adjust and operate. Other objects of the invention will appear from time to time in the specification.

My invention is illustrated more or less diagrammatically in the accompanying drawings wherein Figure 1 is a section in a horizontal plane with parts broken away;

Figure 2 is a section along the line X—X of Figure 1;

Figure 3 is a section along the line Y—Y of Figure 1;

Figure 4 is a section on the line Z—Z of Figure 1;

Figure 5 is a similar section to Fig. 4 with the position of the parts changed;

Figure 6 is a side elevation with parts broken away;

Figure 7 is an end elevation;

Figure 8 is an end elevation with parts removed;

Figure 9 is a sectional view of the rotor;

Figure 10 is an enlarged view of the governor weight;

Figure 11 is a view of the buckets.

Like parts are indicated by like characters in all the drawings.

A is a cylindrical motor generator housing having cast integral therewith a flat supporting base, $A^1$. This cylindrical housing is open at both ends and contains intermediate its ends a web $A^2$, having a central annular opening $A^3$. $A^4$ is a steam chamber within the web $A^2$ provided with a steam inlet passage $A^5$, and communicating with a nozzle $A^6$. This nozzle $A^6$ is placed in a tube $A^7$ which is introduced together with the nozzle in a bore in the web. The tube and nozzle are introduced through an opening in the cylinder which is closed by the plug $A^8$. $A^9$ is the nozzle block in which the nozzle opening proper is formed.

B is an annular exhaust chamber about the periphery of the housing, bounded on one side by the web $A^2$ and on the other side by the rib $B^1$ which partially closes it. The exhaust chamber is enlarged at $B^3$ and communicates with the exhaust pipe $B^4$ and a drain pipe $B^5$. $B^6$ is a removable turbine wall positioned upon the rib $B^1$ and seated against the end of the collar $B^2$. It is parallel with the web $A^2$ and with it unites to make the turbine housing proper within which the turbine wheel is located. This turbine wall has a plurality of outwardly projecting arms $B^7$ which are engaged by the bearing housing support $B^8$. This bearing housing support is held seated against the rib $B^9$ by the screw threaded turbine end closure $B^{10}$. This bearing support is rigidly seated on the rib and the same is true of the turbine end wall. This is possible because the elasticity of the turbine end wall itself makes it safe to seat both snugly and firmly on their seats and any changes caused by any changes in temperature will be taken care of by elasticity of the turbine wall.

C is a cylindrical field magnet having a plurality of poles $C^1$, $C^2$, $C^3$, $C^4$, $C^5$, $C^6$ and coils $C^7$ and $C^8$ associated with these pole pieces. This forms the field assembly or unit which is supported in the housing by the flanges $C^9$ and $C^{10}$, the flange $C^9$ slidably engages the annular bearing surface $C^{11}$ on the rib $C^{12}$ and the flange $C^{10}$ is rigidly held against the rib $C^{13}$ by a bearing housing support $C^{14}$ exactly the same as the one at the turbine end of the housing. This support is in turn held in place by a turbine end cover $C^{15}$ exactly the same as the one at the turbine end of the housing. Thus the field magnet assembly is anchored in place only at one end and is free to slide at the other end while held in central position, thus change in size and shape, caused by expansion and contraction of any of the parts will not in any way affect the operation.

Since the bearing assemblies at either end of the apparatus are identical a description of one will suffice for both. The bearing assembly is mounted on the support $B^8$, which is flanged and provided with spaced webs G supporting a cylindrical member $G^1$. The flange is cut away as at $G^2$ so that no matter where it is placed it may come into register with the passage $G^3$ which is supplied with oil by a passage $G^4$ from the oil well $G^5$, thus it makes no difference in what position the bearing support is placed since lubrication is always assured. $G^6$ is a depression in the face over the perforated plate $G^7$ carried by the member $G^1$. This collar is flanged as at $G^8$ and carries the bearing $G^9$ held in position therein by a spring ring $G^{10}$.

D is a solid stub shaft having a reduced end $D^1$ supported in the ball bearing $G^9$. $D^2$ is a sleeve on such reduced end adapted in cooperation with a nut $D^3$ to hold the bearings and stub end shaft in proper operative position. $D^4$ is an oiling plate fixed on the shaft and having its lower edge immersed in the lubricating oil. $D^5$ is a hollow sleeve rigidly attached to the stub end shaft and extending from it toward the other end of the apparatus. It terminates just short of a similar bearing $G^9$ at the generator end and is closed by hollow plug $D^6$ which plug is reduced to engage such bearing $G^9$ so that we have a rigid shaft fixed in position and held against longitudinal movement comprising a solid stub end shaft a sleeve and a hollow plug. The outside diameter of the sleeve and the stub being the same so as to give in effect a smooth and continuous outer shaft surface. The sleeve $D^5$ is slotted at $D^7$ and contains a plug $D^8$ having pins $D^9$ extending through longitudinal slots $D^7$. This plug engages at one end a coiled spring $D^{10}$ located within the hollow portion of the shaft. The other end of this spring is anchored on a plug $D^{11}$ which is slidable within the shaft and may be adjusted in position by the screw $D^{12}$ which extends out through the hollow plug $D^6$ so that a screw driver engaging the slotted head of the screw $D^{12}$ can change the tension on the spring $D^{10}$ and this tension is the tension which controls and regulates the governor as will hereafter be described.

E is a sleeve slidably mounted on the shaft, it is engaged by the pins $D^9$ so that the spring $D^{10}$ may control the sleeve and provide a yielding resistance to the longitudinal movement thereof and at the same time the pins themselves hold the sleeve against rotation with respect to the shaft. $E^1$ is the electrical rotor. It is more or less Maltese cross shaped in cross section and is made up of a large number of very thin laminated steel or iron plates strung upon the sleeve E. It rotates in a closed smooth walled cylindrical chamber formed by the field magnet poles with filler blocks $E^3$ inserted between them. The ends of the rotor are flanged so that the ends of the faces between the arms of the rotor are closed and no power-absorbing eddy currents are set up during rotation. At either end of the sleeve are collars $E^4$ closing the oil chamber and having flared oiled discharging rings so arranged as to discharge any oil which leaks toward the electrical or steam portion of the apparatus away from the bearings back into the bearing chambers. $E^5$ is a rotor disk. It carries the bucket wheel rim $E^6$ upon which are the buckets $E^{16}$ joined together by the shroud $E^7$. $E^8$ is a ring adapted to reinforce the bucket rim and assist in positioning the parts as hereafter explained. $E^9$ are a series of bent governor weights having outwardly extending knife edges which engage the ring $E^8$ at its engagement with the plate $E^5$, spacing blocks $E^{10}$ hold these governor weights in position. They extend inwardly down through the sleeve E and engage pockets $E^{11}$ in the solid portion of the shaft. Their shape is such that when centrifugal force is exerted by them as the rotor turns they tend to rotate outwardly about their knife edges, and the result is that the central sleeve, the electrical rotor and the turbine are all moved to the left, because since the pivot point cannot move without moving the whole apparatus and since the base point is fixed on the main shaft that is the only movement that is possible. This movement is the movement which is resisted by the governor spring. $E^{12}$ is a driving pin. It extends clear through the shaft and is anchored at either end on the turbine rotor. The ring blocks $E^{10}$ is slotted at $E^{13}$ to permit this pin to move with respect to the turbine so that the pin is able to take the driving load out at the periphery of the turbine leaving all the other parts free to give as the governor controls and moves them. This movement of the turbine to one side, of course, tends to bring the bucket and steam nozzle more or less out of register, and it is this movement that causes the turbine itself to serve as a valve, the shroud moving over and covering the nozzle and decreasing the steam supply, to control and regulate the speed.

F is a condenser located in the base of the housing. One side of the condenser is connected up to one terminal of the electrical coils the other side of the condenser is connected to one of the outside binding posts $F^1$. The other terminal of the electric coils system connects to the binding post $F^2$ so that when a lamp or load is connected with binding post $F^1$ and $F^2$ we have the load, the generator and the condenser all in series with no closed electric circuit except through the condensers. The condenser is inclosed by means of a bottom cover plate $F^3$ held in position by studs $F^4$ through which a sealing strip $F^5$ may be passed. This stud also serves to hold the screw threaded end closure at either end of the housing against rotation, by engaging the closures after they have been screwed up. The idea being the only way the adjustment can be changed is to take out the seal, remove the bottom cover plate F³, unscrew the studs, and then unscrew the housing end plate. F⁶ is a closure for the oil well adapted to be locked by a pad lock F⁷ so that no unauthorized person can tamper with the oil and the oiling system. F⁸ are ventilating ports in the wall of the housing adapted to ventilate the spaces on either side of the turbine, so as to keep the bearings cool and to prevent overheating of the electrical part of the apparatus by the heat from the turbine.

It will be evident that while I have shown in my drawings an operative device, still many changes might be made both in size, shape, and arrangement of parts without departing materially from the spirit of my invention, and I wish therefore that my drawings be regarded as in a sense diagrammatic.

The use and operation of my invention are as follows:

With the apparatus assembled as above, the tension of the governor spring may be adjusted by a rotation of the adjusting screw to set the turbine for operation at the proper speed under normal conditions. The necessary adjustment of the bearings and oil system are also made and then the two end closings are screwed into place in the cylindrical housing, the studs are screwed in from the bottom to lock these end closures against rotation thus making it impossible for anyone to get access to the adjustment of the machine. The lower plate is then put in place, and held in position by the studs and by the seals.

Oil is then poured into the oil pocket until the oil reaches such a level that the conveying discs at either end are merged for an inch or so at the bottom. The apparatus is then sent out and set up on a locomotive the steam and exhaust lines being connected up in the usual manner. As soon as the steam is turned on the buckets are engaged by the moving column of steam and the turbine is rotated. The steam continues to rotate the turbine until a predetermined speed is reached when the centrifugal force of the governor weight tends to move the outer shell or sleeve including the turbine and the electrical rotor longitudinally against the yielding resistance of the governor spring. This movement brings the shroud more or less into register with the steam nozzle and cuts off or controls the flow of steam. As the speed drops down the governor weights lose their centrifugal power and the governor spring moves the parts back into line with the nozzle. Thus governing takes place in the usual manner.

In the form of structure which I have here shown, my turbine wheel takes the form of a hollow box like cylinder in which the governor weights are mounted and thus these parts are not only compactly arranged but they can be thoroughly lubricated. I have also in this structure shown the other parts of the governor as arranged within a hollow shaft which in like manner results in a compact arrangement of the parts and an easy method of lubrication. Both of these arrangements are included in the one structure here shown but either set of parts could be arranged otherwise and yet associated with a set of parts arranged as here shown. This arrangement of the parts also eliminates all windage or friction caused by the motion of the governor parts in a surrounding medium. The governor weight holding the cylinder and the shaft, constitutes enclosed chambers so that the parts within them, together with the media which they contain, are rotated together. This cylinder and hollow shaft are also, during operation, more or less filled with lubricant.

The governor may be conveniently divided for the purpose of consideration hereinafter, into two parts, governor weights part and the tension part. The governor weights are acted upon by the centrifugal force and the tension part is that portion of the governor device which opposes the action of the governor weights.

The nozzle is brought to within five one thousandths of an inch of the surface of the wheel into which it is discharging so that in effect when the wheel is shifted, it reduces the effective opening of the nozzle and actually cuts off the steam differing from a loose connection which simply diverts a portion of the steam from the wheel into the exhaust passages. Thus the method of governing here illustrated, is free from objectionable waste of steam.

The wheel preferably has widely extended surfaces on the sides of the bucket and the nozzle is placed in opposition to the bucket openings and such surfaces, so that when the wheel is shifted, the cutting off or reducing of the effective opening of the nozzle is brought about.

The dynamo here shown is an induction generator used here for the purpose of obtaining the smallest possible generator for the current output required. Such a generator comprises like substantially all other generators, a fixed and a movable part. The movable part in this case is driven by the turbine wheel and its relative position is shifted by the governor to vary the flux and thus vary the voltage of the generator. In this case the generator rotor is mounted on the sleeve with which the governor weights are associated so that when the governor weights act, the rotor is moved or shifted. The effective position of the rotor is varied when the rotor is shifted with respect to the opposed parts of the generator.

The lubricant which is thrown up by the oil disc, gathers on the top of the interior surface of the end of the casing and is deflected over onto the upper outer wall of the inner oil chamber proper, flows down the surface of the same into the ball bearing, works its way into and thence out of the inner oil chamber so as to maintain to a certain extent, a certain amount of oil through the ball bearing.

The rotor of the generator lies in an annular pocket formed of the sleeve on which the rotor is mounted, the spacing block at one end and the annular shield plate at the other. All these parts rotate with the rotor. The outer periphery of the rotor is enclosed or provided with a surrounding wall in which it rotates, formed by the field poles and the bridges between the field poles. These are formed of non-magnetic and dielectric material. By this arrangement, the rotor is placed in a closed cylindrical pocket in which it rotates, thus reducing the friction due to windage.

The generator of this motor generator set contains two parts, one non-rotating and the other rotating and their relative movement is what develops the current. One of these parts, and in the form in which I have illustrated it, the rotating part, is also movable longitudinally and this is done by the governor and the effect of such movement is to vary the area of the magnetic flux path. The governor operates to shift longitudinally, the rotating part responsive to speed variations and the effects of this shifting is to tend to prevent or minimize the variations in the voltage otherwise due to the variations in speed.

The turbine wheel is connected with the shaft by means of a transverse pin which passes through the shaft to the outer periphery of the inner face of the wheel and here the two ends are received into slots formed within the wheel so that as the wheel rotates, it carries the shaft by means of engagement with the pin and the slots permit the wheel to slide rotatably with the shaft. This motion developes friction between the pin and that portion of the wheel with which it engages and to reduce this friction to a minimum, this pin or its two extremities are extended as far as possible outwardly from the shaft. In other words, the driving connection between the wheel and the shaft is made as far as possible from the axis of the shaft.

The lubricant inserted in the exterior casing is carried by the conveying disc upwards and otherwise distributed so that it flows into the bearings and finds its way between the sleeve and a central cylindrical shaft until it supplies lubricant to the chamber within the shaft which contains the tension device. It may pass also between the shaft and the sleeve into the governor weight chamber. The connection is substantially the same with reference to each end of the machine. Thus the bearing and sliding parts are lubricated and the governor parts and the two governor chambers are lubricated. The generator chamber is, however, not thus exposed directly to the oil and this chamber is relatively free from oil.

I claim:

1. In a turbine motor generator set, a turbine wheel, a generator rotor driven thereby, a governor driven by the wheel and means including said governor responsive to speed variations of the rotor and turbine wheel for laterally displacing the turbine wheel and the generator rotor in unison.

2. A turbine motor generator set, comprising a turbine wheel, a generator rotor driven by the wheel and a governor responsive to the speed variations of the wheel and connected with, so as to shift the effective position of, the rotor and a movable sleeve on which the wheel and rotor are mounted.

3. A turbine motor generator set, comprising a turbine wheel, a generator rotor driven by the wheel and a governor responsive to the speed variations of the wheel and connected with, so as to shift the effective position of, the rotor and a movable sleeve on which the wheel and rotor are mounted, and a shaft on which the sleeve is slidably mounted.

4. A turbine motor generator set, comprising a turbine wheel, a generator rotor driven by the wheel and a governor responsive to the speed variations of the wheel and connected with, so as to shift the effective position of, the rotor and a movable sleeve on which the wheel and rotor are mounted, and a shaft on which the sleeve is slidably mounted, the governor weights mounted in the wheel and fulcrumed on the shaft.

5. In a turbine motor generator set, a slotted sleeve, governor weights passing through said slots, a tension member and pins on which it is mounted, holes in the sleeve through which the pins extend, a shoulder on the sleeve, a turbine wheel engaging the shoulder and a generator rotor mounted on a reduced portion of the sleeve.

6. In a turbine motor generator set, a slotted sleeve, governor weights passing through said slots, a tension member and pins on which it is mounted, holes in the sleeve through which the pins extend, a shoulder on the sleeve, a turbine wheel engaging the shoulder and a generator rotor mounted on a reduced portion of the sleeve, oil chambers which connect directly with the inner surface of the sleeve.

7. In a turbine motor generator set, a slotted sleeve, governor weights passing through said slots, a tension member and pins on which it is mounted, holes in the sleeve through which the pins extend, a shoulder on the sleeve, a turbine wheel engaging the shoulder and a generator rotor mounted on a reduced portion of the sleeve, oil chambers which connect directly with the inner surface of the sleeve, and a shaft on which the sleeve is mounted.

In testimony whereof, I affix my signature in the presence of two witnesses this 15th day of August, 1919.

CHARLES W. DAKE.

Witnesses:
 AGNES C. JOHNSON,
 MILDRED H. MACKE.